Figure 1:
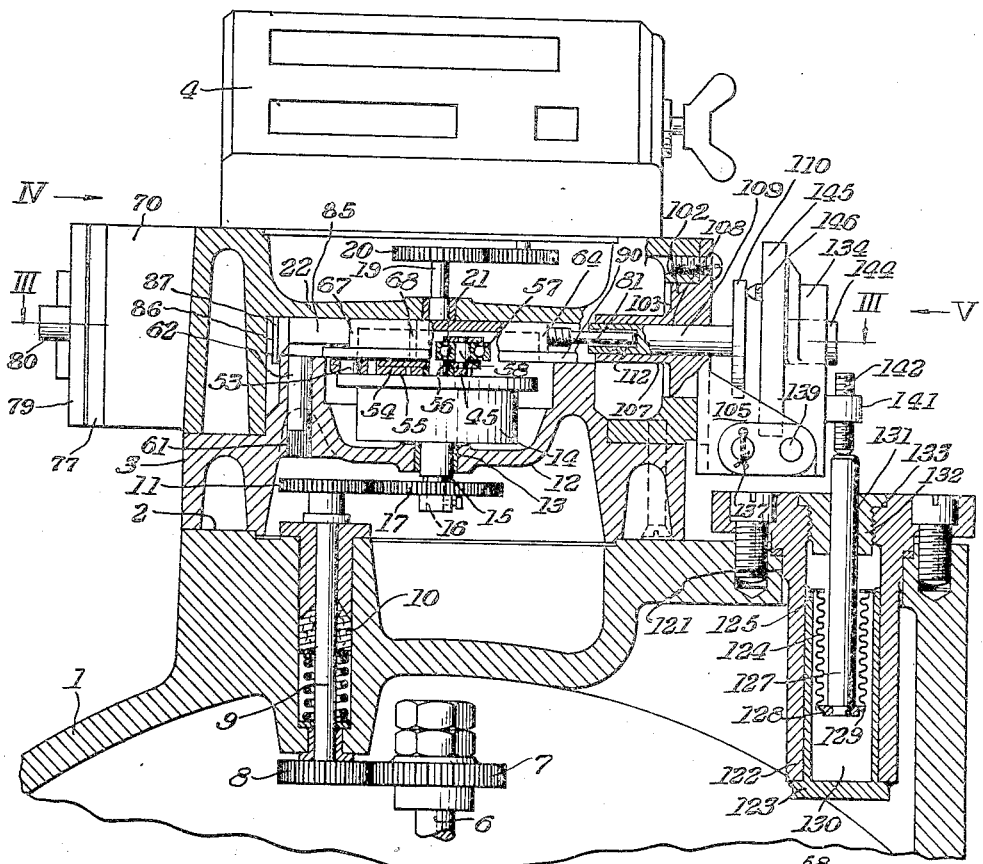

April 6, 1948.                W. H. MARSH                2,438,934
                    TEMPERATURE COMPENSATED METER
                    Filed Jan. 17, 1941        3 Sheets-Sheet 1

INVENTOR
Walter H. Marsh
BY
Lewis D. Konigsford
ATTORNEY

April 6, 1948. W. H. MARSH 2,438,934
TEMPERATURE COMPENSATED METER
Filed Jan. 17, 1941 3 Sheets-Sheet 2

INVENTOR
Walter H. Marsh.
BY
Lewis D. Konigsford
ATTORNEY

April 6, 1948. W. H. MARSH 2,438,934
TEMPERATURE COMPENSATED METER
Filed Jan. 17, 1941 3 Sheets-Sheet 3
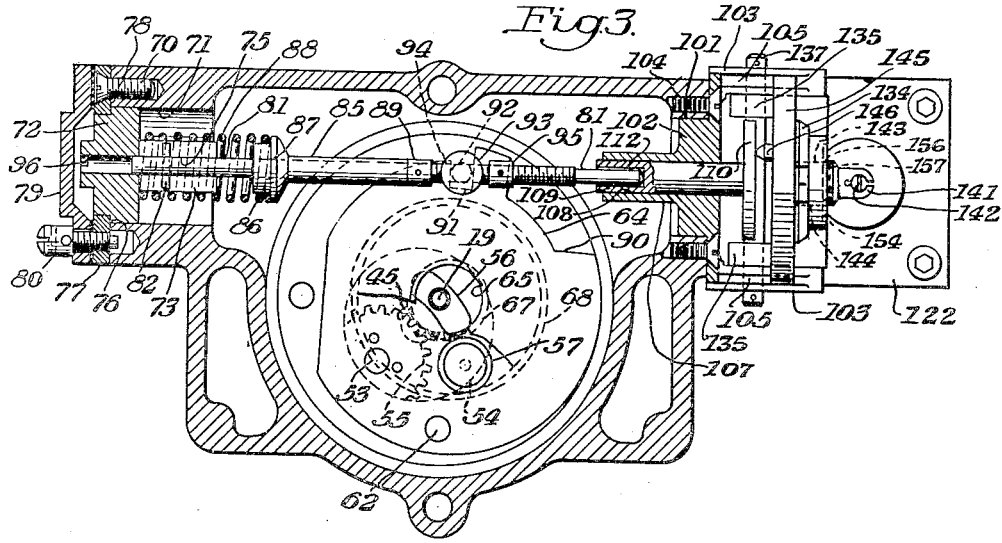
INVENTOR
Walter H. Marsh.
BY
Lewis D. Konigsford
ATTORNEY Patented Apr. 6, 1948

2,438,934

UNITED STATES PATENT OFFICE 2,438,934

TEMPERATURE COMPENSATED METER

Walter H. Marsh, Crafton, Pa., assignor to Rockwell Manufacturing Company, a corporation of Pennsylvania Application January 17, 1941, Serial No. 374,859

9 Claims. (Cl. 73—233)

The present invention relates to improvements in fluid meters driving a register which embodies thermal responsive means between the meter and register for compensating the register from standard calibration for variations in the temperature of the fluid being measured.

Petroleum products are sold on the basis of volumetric measurement at 60° F. and it is apparent that when a volumetric measurement of a specific product is made at any other temperature an error occurs unless the change in volume due to temperature change is taken into account. However, the density of various petroleum products is not constant, and may even vary for different specifications of a single commercial product. Thus, there not only is a difference in density between crude oil, refined lubricating oil and gasoline, but the density of the various types of gasolines is not a constant factor. The proper volumetric measurement of a petroleum product, therefore, requires not only a correction factor for the density of the product being measured, but also a correction for the temperature difference of the fluid from standard temperature.

It is not unusual to use the same pipe line common carrier for transporting various fluids, as only a limited quantity of the border fluids become commingled. In recent years, meters have come into use on such lines to measure the fluids. When a meter is employed on a pipe line for measuring fluids, it has been necessary to manually calculate the corrected volume from the meter reading by measuring the temperature and determining the specific gravity from a sample of the metered fluid. This involves laborious work and introduces the possibility of human error. While attempts heretofore have been made to automatically introduce a temperature correction factor into the measured volume, such devices have involved correction for ambient temperature changes which has not always been satisfactory, but even when the temperature factor was taken into account, the errors due to changes in specific gravity have had to be corrected by manual calculation with the disadvantages pointed out above.

It is an object of the present invention to provide a fluid meter which will accurately measure the volume of fluid and automatically compensate for variations in temperature of the fluid from a given standard substantially free from ambient temperature influences.

A further object is the provision of a fluid meter which will accurately measure the volume of fluids of various specific gravities and automatically compensate for variations in the temperature thereof.

Another object is the provision of a fluid meter which will accurately measure the volume of fluid and automatically compensate for variations in temperature of the fluid being measured and which is adjustable for different fluids of different specific gravity.

Another object is the provision of a fluid meter which will accurately measure the volume of fluid compensated for variations in temperature and specific gravity of the fluid being measured, the compensation for specific gravity variations being ineffective at the base temperature.

According to the present invention, I provide a meter with a variable drive device between the register and meter, and I provide a direct connection between the temperature responsive element and the variable drive device, thereby obviating ambient temperature influences and making compensation therefor unnecessary. Preferably the direct connection between the temperature responsive element and the variable drive device is adjustable so as to vary the ratio of drive change to temperature compensation and by calibrating this adjustment for different fluids of different density, I am able to combine with the temperature compensation a compensation for change in specific gravity. This adjustment is facilitated by grouping the various petroleum products into eight groups depending on the specific gravity range, and selecting a temperature coefficient for each group. The groupings of the American Petroleum Institute are given in the following table.

| Group | A. P. I. Degrees, Gravity Range | Factor |
|---|---|---|
| 0 | Up to 14.9 | .00035 |
| I | 15.0– 34.9 | 40 |
| II | 35.0– 50.9 | 50 |
| III | 51.0– 63.9 | 60 |
| IV | 64.0– 78.9 | 70 |
| V | 79.0– 88.9 | 80 |
| VI | 89.0– 93.9 | 85 |
| VII | 94.0–100.0 | 90 |

Figure 2:
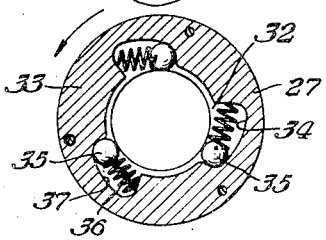
Figures 4, 5, 8:
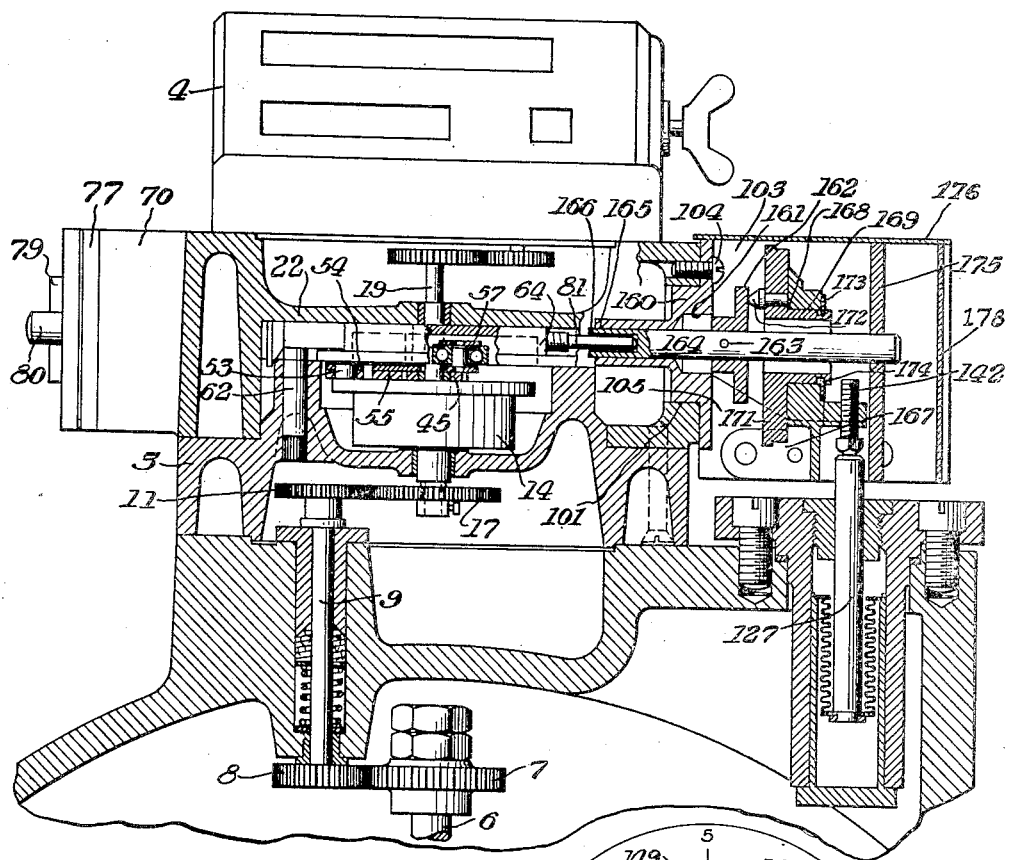

The invention will be described in greater detail in the following specification, taken in connection with the accompanying drawing, wherein I have illustrated preferred embodiments of the invention by way of example, and wherein:

Figure 1 is a view partly in vertical section of a preferred embodiment of the invention, Figure 2 is a sectional view of a detail, Figure 2a is a vertical sectional view of a detail, Figure 3 is a view partly in horizontal section on line III—III of Figure 1 with certain parts broken away, Figure 4 is a side elevation of a detail looking in the direction of the arrow IV in Figure 1, Figure 5 is a side elevation of a detail looking in the direction of the arrow V of Figure 1, Figures 6 and 7 are partly diagrammatic views of the gravity group adjustment, Figure 8 is a view similar to Figure 1 of a modification, Figure 9 is a side elevation of a detail of Figure 8, and Figure 10 is a plan view of Figure 9.

Referring to the drawing, there is shown a casing 1 of a meter of any suitable construction, for example, that disclosed in the application of Walter H. Marsh, Serial No. 179,394, filed December 13, 1937, now Patent 2,274,206, granted February 24, 1942. The casing cover has a machined upper surface 2 to which is secured in any suitable manner the housing 3 for the drive mechanism between the meter and the register 4 suitably secured thereon. The shaft 6, driven by the meter, has a gear 7 thereon which meshes with a gear 8 secured on a shaft 9 passing through a suitable stuffing box 10 in the cover and having a gear 11 at its outer end. The housing 3 has a bottom wall 12 which is bored to receive a bushing 13. A driving member 14 has a journal portion 15 which is journalled in the bushing 13, and a flattened shaft 16 extending therefrom receives a gear 17 meshing with the gear 11.

The register drive shaft 19 carries a gear 20 at the top meshing with a suitable change gear by which the register is driven. Shaft 19 is separate from member 14 and is journalled in bushing 21 in the top wall 22 of the casing 3 and its lower end is received in a bore 23 in the part 15 of driving member 14. A drum 24 is secured to shaft 19, as by a pin 25, and is received in the recess 26 of the driving member 14.

A multiple one-way drive assembly is received in recess 26, and in the preferred embodiment comprises a lower ball clutch drive member, indicated generally at 27, surrounding the drum 24 and secured to the drive member 14 by screws 28 or in any other suitable manner, and an upper clutch driving member, indicated generally at 29, surrounding the drum 24, and journalled for free rotation in the recess 26. The ball clutch driving members may be of any suitable construction and preferably comprise a pair of flanged brass clutch plates 31 and 32 riveted together with a steel plate 33 in between to provide recesses 34 in which are located hardened steel balls 35 urged inwardly by suitable springs 36. The circumferential walls 37 of the recesses are inclined toward the center so that when the lower clutch member 27 is turned counterclockwise, as viewed in Figure 2, the balls are wedged between the clutch drum 24 and recess walls 37 to grip and rotate the drum. Any desired number of such balls may be provided, and it will be apparent that they may be regarded singly or jointly as one form of a one-way drive means. The upper ball clutch assembly 29 is similarly constructed and is arranged to drive when it is rotated counterclockwise.

The top plate 41 of the upper clutch member has a boss 42 which is received in the center hole of a gear 45, the gear being suitably secured therein, as by rivets or the like. The driving member 14 has a flange 51 which is drilled at 52 to receive a pivot pin 53 which may be fluted at its lower end and is driven into place. A plate 54 has a gear segment 55 riveted thereto, and pin 53 passes through a hole in plate 54 and the center of gear segment 55 so as to hold the gear segment in mesh with gear 45. An arcuate slot 56 is provided in the plate through which passes the register drive shaft 19, and it will be apparent that the plate 54 and gear segment 55 thus are capable of pivotal movement about the pin 53 as they rotate in unison with driving member 14. A roller 57 is journalled on a suitable pin 58 riveted into the plate 54, this roller preferably being journalled in antifriction ball bearings.

The casing 3 is bored at 61 to receive a fluted dowel 62 (shown in transposed position in Figure 1) driven therein, and a cam member 64 is pivoted on pin 62, and overlies the one-way drive mechanism, with register drive shaft 19 passing through an opening 65 therein. The cam 64 is cut away to provide a groove or recessed track or orbit between guide walls 67 and 68 which receives the roller 57 therein with a running clearance, and the pivot pin 62 enables the cam to be adjusted to a concentric or eccentric position relative to the center of the one-way drive means. The cam preferably is so located as to keep plate 54 from upward displacement from pin 53.

The casing 3 has an extension 70 at one side having a bore 71 therein which receives guide member 72 having a longitudinally split central hub 73 with a bore 75 therein. Guide 72 has a shoulder 76 adapted to abut a ring 77 secured to the end face of the extension 70 by suitable screws 78, and a cover 79 is bolted to the ring by means of bolts 80, the heads of which may be drilled to receive a wire and lead seal. A rod 81 passes through bore 75 with a sliding fit and has a pin 82 therein which enters the slot in hub 73 so that rod 81 may turn with guide member 72. Rod 81 receives a sleeve 85 in which it is freely movable and which provides a guide portion 86 and a shoulder 87 for the spring 88, the opposite end of the spring being received over hub 73 and abuts member 72. Limit sleeve 85 is held by spring 88 in abutting relation to a collar 89 pinned to rod 81. The cam 64 has a flange 90 in which is located a slot 91 that receives a stud 92 having a head 93 that is bored and threaded at 94 to receive the threaded end of rod 81. Stud 92 is of such length as to fit between the flange 90 of the cam and the machined under surface of top plate 22. A second limit collar 95 is pinned to rod 81 on the opposite side of stud 92. A kerf 96 is provided in the end of member 72 whereby the member 72 and rod 81 may be manually rotated by a screw driver inserted in the kerf 96, thus moving stud 92 along threaded rod 81 and shifting the cam member 64 about pivot 62, and the collars 89 and 95 serve to limit the extremes of manual adjustment of the cam.

The opposite side of casing 3 has a bore 101 which receives the boss 102 of a bracket 103 secured to the machined face surrounding the bore by screws 104. Boss 102 has arms 105 and a guide hub 107 which is bored at 108 to slidably receive a rod 109 with a head 110 on the outer end. The inner end of the rod 109 is bored at 112 to slidably receive the reduced end of the rod 81.

The meter casing or cover provides a well 121 which receives a capsule 122 subject to the temperature of the fluid being measured, this capsule preferably comprising a flanged cylinder adapted to receive a flanged tube 123 welded or otherwise secured across its open end and having one end of a bellows 124 suitably secured thereto at 125 in fluidtight relation. A rod 127 has a flange 128 welded or otherwise secured to the inner end, and the opposite end of bellows 124 is suitably secured to this flange as at 129. There is thus provided a variable volume chamber 130 containing a fluid such as acetone or the like which responds to changes in temperature. Rod 127 extends through a guide hole 131 in a flanged bushing 132 which is threaded into a bore 133 in the end of the capsule.

An adjustable bell crank member 134 has inwardly extending arms 135 and a pin 137 suitably held against removal passes therethrough and through arms 105 of bracket 103 and pivotally supports the bell crank member. A second hole 139 is provided for a purpose to be described later. Bell crank 134 has a split boss 141 which is bored and threaded to receive an adjusting screw 142 which bears on the upper end of rod 127. The bell crank member is bored at 143 to receive a trunnion 144 carrying a selector disk 145, and a tapered pin 146 projects from the inner face thereof and bears on head 110. Preferably pin 146 extends from the disk 145 to a distance equal to the distance between the center of pin 137 to disk 145, as this simplifies calibration. Thus, spring 88 bearing against sleeve 85 urges rod 81, rod 109 and head 110 against pin 146, and also urges bell crank 134 to the right to cause screw 142 to engage against rod 127. Bell crank 134 has a recess 154 in one face and a spring washer 155 located therein engages a groove 156 in trunnion 144 to prevent removal thereof but allow the trunnion to be rotated by means of a kerf 157 in the end thereof.

Disk 145 is rotatable with trunnion 144 and is calibrated to co-operate with an index mark 149 on the bell crank member. As shown in Figure 5, this disk indicates various groups and various specific gravities in degrees A. P. I. for which the adjustment is intended. On the opposite side the ring 77 has an index mark 151 and the guide member 72 is calibrated with indices on its face. Preferably the ring also bears legends to indicate the directions in which the member 72 is to be turned to increase or decrease the driving ratio between the meter and register.

The operation of the apparatus now will be described. Referring to Figures 1 and 2a, member 14 is rotated from the meter by means of the interposed gearing and drives with it the lower clutch member 27. Upon rotation of the lower clutch member in counterclockwise direction, as viewed in Figure 2, the balls 35 grip the clutch drum 24, which is attached to register drive shaft 19, and the register drive shaft thus is rotated at the same speed as the member 14. Referring to Figures 2a and 3, it will be seen that plate 54, carrying roller 57, rotates with the member 14 and causes roller 57 to travel in the cam track provided between walls 67 and 68. When the track is eccentric to shaft 16 (or shaft 19) the eccentric path of roller 57 will oscillate the plate 54 about the pivot 53 and segment gear 55 secured to the plate will be oscillated therewith about its pivot 53, thus producing an oscillating motion of gear 45 in mesh therewith. When gear 45 oscillates clockwise the balls of the secondary clutch 29 idle over the clutch drum 24, but when the oscillation occurs in the reverse direction, i. e., counterclockwise, the balls of clutch 29 grip the drum 24 and impart an overdrive thereto, which is superinduced on the rotation of shaft 19, thus driving the register shaft 19 at an increased rate, which depends on the eccentric setting of the cam track. That is, of the two ball clutches or one way drive means, the faster moving one drives the shaft 19. It will be understood that within certain limits the change in drive ratio will be substantially proportional to the displacement of the cam track. By varying the eccentric position of cam 64 with respect to shaft 19, the extent of overdrive can be controlled within the limits of the adjustment, in accordance with the specific gravity and related expansion coefficients of liquids being measured. This adjustment is ample within commercially acceptable limits for the liquids within an A. P. I. group over a 100° F. temperature range. This may be done manually by rotating the retainer 72 which, through the pin 82 and slot connection, rotates threaded rod 81 to shift the position of stud 92 thereon, and thus shift the cam about the pivot 62. This shifting also may be accomplished by changes in temperature of the liquid being metered, as will now be described.

Referring to Figure 1, it will be seen that any change in temperature of the liquid contained under cover 1 will affect the temperature of the fluid in chamber 130, causing its volume to change and thus move the bellows 124 and with it the rod 127 upwardly or downwardly depending on whether the temperature change is an increase or a decrease. Assuming it to be an increase, the rod 127, which engages screw 142, will be moved upwardly, thus moving the bell crank 134 about the pivot 137, and pin 146 engaging head 110 will move the rod 109 inwardly and thus will shift adjustment rod 81 and stud 92 bodily to adjust the cam position and change the drive ratio between the meter and register in accordance with the temperature of the fluid being measured. The spring 88 and pin and slot connection of rod 81 with retainer 72 allows this shifting to occur.

By calibrating the temperature compensated mechanism at 60° F., the register will be driven slower when the temperature rises, and will be driven faster when the temperature falls.

The means and theory for adjustment for various specific gravities and expansion coefficients over a range of a plurality of A. P. I. groups now will be explained. Referring to Figure 6, it will be seen that the distance from the center of pin 137 to the point of contact of screw 142 and rod 127 is indicated by the letter R. In Figure 7, the actual radius T from point 137 to the center of pin 146 is projected horizontally and indicated at S. If the disk 145 is turned to a position such that pin 146 moves to the position indicated at V, its projected radius will be S'. Therefore, the leverage of the two positions of the pin will be directly proportioned to S to S'. Thus, the effective leverage ratio S to R of the bell crank 134 may be changed by rotating the disk 145 to change the ratio to S' to R, wherein S' represents an adjusted position of pin 146, and by properly calibrating the disk 145 with reference to a reference point 149, a selection of lever ratios may be made corresponding to the specific gravity of the oil. As shown, the calibration is for six A. P. I. groups and for degrees gravity A. P. I. It will be understood that the disk 145 may be graduated for any desired property of the fluid to be measured.

The holes 139 are accurately determined and located so that when a locking pin 147 (Figure 10) is inserted therethrough the axis of rotation of disk 145 will be normal to the plane of the face of head 110. That is, the circle described by the apex of pin 146 will be coincident with the plane of head 110 at all times. The temperature responsive element then is inserted in a fluid at 60° F. or is maintained at this temperature in any other suitable manner, and the screw 142 then is turned down until it firmly engages rod 127. It will be seen that in this position when the selector disk 145 is rotated the leverage ratio of S to R is changed but this change is without effect on the drive means as the pin 146 rotates in the same plane as the face of head 110. Hence it is possible to bring the register into proper adjustment with the meter at the base temperature without disturbing the temperature adjustment, or without disturbing the density adjustment. The locking pin 147 then is removed. The register now is set into agreement with the meter by setting the group selector to the proper group and running an accurately weighed quantity of fluid through the meter at any suitable temperature, the manual adjustment enabling the cam to be moved to proper position without changing the temperature calibration to make the register correspond to the corrected volume passed through the meter.

The adjustment so far described must generally be made prior to the installation of the meter in the line, due to the necessity of bringing the thermostat to the base temperature. Because adjusting screw 142 and rod 127 are normally in separable abutment and held in contact by the biasing spring 88, it is possible to adjust the mechanism in the field without removing the meter from the line and regardless of whether the temperature of the line fluid and thermostat are above or below the base temperature. This adjustment is preferably made while the line fluid temperature is approximately midway in the range of the normal variations. This is accomplished by backing the adjustment screw 142 away so it is out of contact with rod 127. Locking pin 147 is then inserted through the holes 139 in bell crank assembly to locate the mechanism in the base temperature position. The adjustment screw 142 is then turned to a position where it contacts the temperature responsive rod 127 with just sufficient contact pressure so that the locking pin 147 may be moved to the registering holes 139 freely. The line temperature is then observed and the position of the rod 127 with respect to its position if the line fluid were at the base temperature is calculated. In the commercial embodiment of the mechanism disclosed rod 127 moves .212 per 100° F. temperature change of the line fluid. Locking pin 147 is then removed and screw 142 is then turned in or out (depending upon whether the line temperature is above or below the base temperature) by an amount sufficient to produce a linear movement equal to the said calculated figure. In said commercial embodiment one turn of screw 142 produces a linear movement of .03125 inch. The meter may now be calibrated with a weight or volumetric prover in the usual way, by operating member 72 through kerf 96 to alter the speed ratio of the speed change mechanism. When a volumetric prover is used, the measured volume must be calculated to the base temperature. Correction to the base temperature of the liquid in a weight prover is not necessary. It will accordingly be seen that provision of the separable abutting spring engaged elements in the operating assembly between the thermostat and the speed change mechanism permits ready calibration in the field to base temperature without removing the apparatus from the line, thus enabling adjustments to be made as frequently as desirable to take care of wear in the meter and to provide for maximum accuracy of measurement of pipe line fluids of differing specific gravities.

Chamber 130 connects with the adjustment mechanism by a rod 127 which is mainly surrounded by the liquid being measured in cover 1, only a very small portion being subject to ambient temperature influences. However, if desired, a compensation for ambient temperature may be employed as disclosed in my copending application, Serial No. 244,596, filed December 8, 1938, for Temperature compensated meter, which has been abandoned.

In the modification shown at Figures 8 to 10, the boss 160 in bore 101 is counterbored at 161 to receive the hub of a head 162 pinned at 163 to longitudinally movable shaft 164 extending through a bore 165 in the boss. The end of shaft 164 is recessed at 166 to receive the end of rod 81. Bell crank 167 is bored at 168 to receive the hollow stub 169 of a knurled disk 171 having a pin 172 therein, and a split washer 173 co-operates with a groove 174 in the stub 169 to hold the disk in position. Disk 171 is calibrated like disk 145 and corresponds thereto, and a locking pin 147 having a knurled head fits into the bore 139 for calibration, as previously described. A bearing plate 175, secured by suitable screws to the arms 105, provides a bearing for the rod 164. A semi-cylindrical cover 176 may be secured in place to provide a housing for the mechanism, and an end plate 178 secured by suitable screws (not shown) to the posts 179 extending from plate 175 covers the end of the housing.

What I claim as my invention and desire to secure by United States Letters Patent is:

1. In combination with a metering apparatus for measuring the volume of fluids at predetermined base temperature, including a displacement device, a register, a speed change mechanism between said device and said register, and a base structure supporting said speed change mechanism; thermostatic means controlling the speed ratio of said speed change mechanism responsive to the temperature of the fluid being metered; fixed fulcrum manually settable mechanism adjustably supported on said base structure actuated by said thermostatic means to control the speed ratio of said speed change mechanism and operative to vary the ratio of response of said speed change mechanism per unit of movement of said thermostatic means; means to temporarily fix the position of said manually settable mechanism with relation said base structure; and means to set the operative relationship of said thermostatic means to the fixed position of said manually settable mechanism, at temperatures of said thermostatic means differing from said base temperature.

2. In combination with a metering apparatus for measuring the volume of fluids at predetermined base temperature, including a displacement device, a register, and a speed change mechanism between said device and said register; a reference base structure; a calibrated thermostatic mechanism controlling the speed ratio of said speed change mechanism mounted in said base structure and responsive to the temperature of the fluid being metered; manually settable mechanism actuated by said thermostatic mechanism and controlling the speed ratio of said speed change mechanism; means for temporarily fixing said manually settable mechanism with respect to said reference base structure to prevent movement thereof with respect to said speed changing mechanism during adjustment of said thermostatic mechanism; and means to adjust the relationship of said thermostatic mechanism to said manually settable mechanism at temperatures of said thermostatic means differing from said base temperature.

3. In a measuring system of the type that comprises a meter, a speed change mechanism and a register in which the speed change mechanism has a member shiftable with respect to the speed change mechanism to vary the speed of said mechanism, the combination with said member of a pivoted bracket having a disk carrying a pin mounted in said bracket for rotative adjustment in a plane parallel to the axis of the pivot of said bracket, said pin bearing against said member, and thermostatic means arranged to shift said bracket on its pivot and thus adjust said member.

4. In a measuring system of the type that comprises a meter, a speed change mechanism and a register in which the speed change mechanism has a member shiftable with respect to the speed change mechanism to vary the speed of said mechanism, the combination with said member of a pivoted bracket having a pin adjustable toward and from the pivot of said bracket, said pin bearing against said member, thermostatic means arranged to shift said bracket on its pivot through separable abutting contact surfaces and thus adjust said member and an adjusting means to properly locate said bracket with respect to said thermostatic means at a selected base temperature and at temperatures of said thermostatic means differing from said base temperature.

5. In a measuring system of the type that comprises a meter, a speed change mechanism and a register in which the speed change mechanism has a member shiftable with respect to the speed change mechanism to vary the speed of said mechanism, the combination with said member of a pivoted bracket having a pin adjustable toward and from the bracket pivot, said pin bearing against said member, thermostatic means arranged to shift said bracket on its pivot through separable abutting contact surfaces, an adjustment between said thermostatic means and bracket, and means to temporarily hold said bracket from movement about its pivot during adjustment of said pin or the relative position of the thermostatic means with respect to the bracket independently of the temperature of said thermostatic means.

6. In a measuring system of the type that comprises a meter, a speed change mechanism and a register in which the speed change mechanism has a member shiftable with respect to the speed change mechanism to vary the speed of said mechanism, the combination with said member of a pivoted bracket having a disk carrying a pin mounted in said bracket for rotative adjustment in a plane parallel to the axis of the pivot of said bracket, said pin bearing against said member, and thermostatic means arranged to shift said bracket on its pivot and thus adjust said member, and index means between said disk and bracket to visibly indicate the degree of adjustment of said pin.

7. In a fluid metering apparatus for measuring fluids at predetermined base temperatures of the type that includes a fluid meter, a register and variable ratio drive means coupling said register and meter; the combination with said variable ratio drive means of a movable means having a substantially plane surface to vary the driving ratio thereof; a pivoted bracket; a member rotatably carried by said bracket and having an extension located eccentrically and adapted to engage said surface; temperature responsive means connected to move said bracket about its pivot; and means between said pivoted bracket and said temperature responsive means to adjust the datum conditions.

8. In a fluid metering apparatus of the type that includes a variable ratio drive means; the combination with said variable ratio drive means of movable means having a substantially plane surface to vary the driving ratio thereof; a pivoted bracket; a member rotatably carried by said bracket and having an extension located eccentrically and adapted to engage said surface; temperature responsive means connected to move said bracket about its pivot; and means for manually adjusting said variable ratio drive means independent of the temperature responsive means.

9. In a measuring system of the type that comprises a casing, a meter, a speed change mechanism and a register in which the speed change mechanism has a rod shiftable with respect to the speed change mechanism to vary the speed of said mechanism, the combination with said rod of a spring between the rod and casing to urge said rod in one direction, an adjustment between said rod and said speed change mechanism comprising a rotatable element slidably connected to said rod accessible from the outside of the casing permitting metering registration during adjustment, thermostatic means arranged to shift said rod in opposition to said spring and a further adjustment between said rod and said thermostatic means whereby the effect of said last named means on the rod may be varied.

WALTER H. MARSH.

REFERENCES CITED

The following references are of record in the file of this patent:

UNITED STATES PATENTS

| Number | Name | Date |
|---|---|---|
| 2,206,540 | Whittaker | July 2, 1940 |
| 2,208,687 | Renfrew | July 23, 1940 |
| 2,156,813 | Hazard | May 2, 1939 |
| 2,129,066 | McGogy | Sept. 6, 1938 |
| 2,151,201 | Griffith | Mar. 21, 1939 |
| 2,162,375 | Chrisman | June 13, 1939 |
| 2,191,766 | Marsh | Feb. 27, 1940 |
| 2,190,506 | Wurr | Feb. 13, 1940 |
| 2,216,016 | Marsh | Sept. 24, 1940 |
| 2,088,270 | McCandless | July 27, 1937 |
| 2,059,547 | Brandle | Nov. 3, 1936 |
| 2,164,671 | Thoresen | July 4, 1939 |
| 2,222,551 | Ziebolz et al. | Nov. 19, 1940 |
| 2,100,037 | Sandvoss | Nov. 23, 1937 |
| 1,509,669 | Eggleston | Sept. 23, 1924 |
| 2,302,529 | Cornell et al. | Nov. 17, 1942 |

FOREIGN PATENTS

| Number | Country | Date |
|---|---|---|
| 493,202 | Great Britain | Oct. 5, 1938 |